April 11, 1939.  C. F. JONES  2,154,129

TRAILER CONSTRUCTION

Filed March 16, 1937

INVENTOR
CLARENCE F. JONES
BY
ATTORNEY

Patented Apr. 11, 1939

2,154,129

UNITED STATES PATENT OFFICE 2,154,129

TRAILER CONSTRUCTION

Clarence F. Jones, Fort Collins, Colo.

Application March 16, 1937, Serial No. 131,129

5 Claims. (Cl. 280—81)

The invention herein disclosed relates to the construction of a vehicle, and more particularly to a construction for transmitting the load to the axle of the vehicle, that is particularly suitable for heavy duty vehicles, such for example as a heavy duty trailer of the type used for transporting multi-ton loads.

It is an object of this invention to provide a construction in which the use of springs is dispensed with and the load is transmitted to the axle directly. Another object of the invention is to provide in such a construction sufficient flexibility in the axle so that the wheels may accommodate themselves to variations in the road surface.

These objects and certain advantages inherent in the invention are obtained, in accordance with the invention, by forming a transverse axle-receiving slot in a side beam of the trailer, for example, adjacent the end of the beam. Within this slot the axle is placed and the load is transmitted from the beam to the axle through a load-transmitting member that is secured to the beam. The load-transmitting member extends across the axle-receiving slot in the beam and bears upon the axle.

This construction is shown in detail in the accompanying drawing in which.

Figure 1:
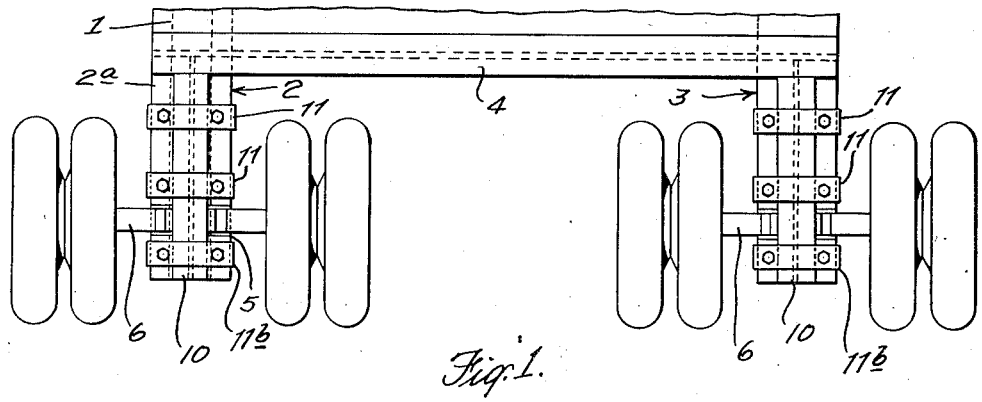
Fig. 1 is a plan view of the rear end of a trailer.

In the drawing the trailer is shown as of the type that is attached to the rear of a truck. It consists of a platform 1 that is supported by a frame which includes two side beams 2 and 3 extending longitudinally of the trailer and a transverse beam 4 extending between and mounted on the longitudinal beams 2 and 3.

The beams 2 and 3 are identical in construction and in the manner in which they are mounted on the axle, a separate axle being provided for each beam. For this reason the constructional features will be described only in reference to the beam 2. This beam in the trailer 2 is made up of two identical I beams 2a and 2b lying side by side and welded together along the contiguous edges of the flanges as indicated at 2c and 2d. The end of the beam 2 extends beyond the transverse beam 4 which represents the rear of the load carrying platform 1. In this extended portion of the beam 2 and adjacent the end of the beam, there is cut a transverse slot within which there is mounted a channel-shaped box 5, the channel-shaped box extending transversely of the beam and being welded to the beam. Within the box 5, an axle 6 is placed.

The axle 6 has a central section 6a, between brake flanges 7 mounted on the axle, that is square in cross-section. Extending from one side of this square section and formed integral with the axle, there are two spaced keepers 6b, the purpose of which will hereinafter appear. The square section, at each end, merges into a section 6c on one side and a section 6d on the other side. The sections 6c and 6d are circular in cross-section and form the spindles upon which the wheels 8 and 9 are mounted. As shown in Fig. 1, there are two pair of wheels mounted on the axle, one pair on each side of the beam 2. The wheels are rotatably mounted on the axle.

Figure 2:
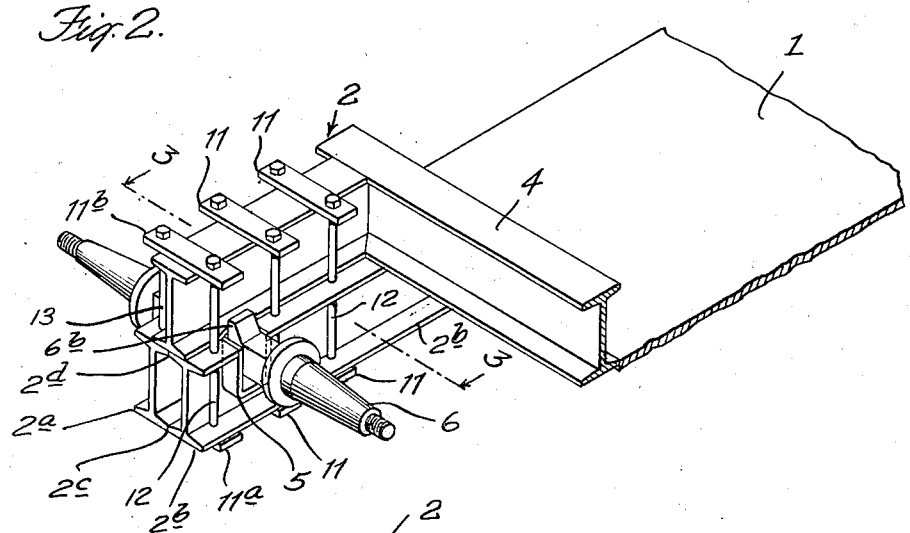
Fig. 2 is an isometric of one corner of the rear of the trailer with the wheels removed.
Figure 3:
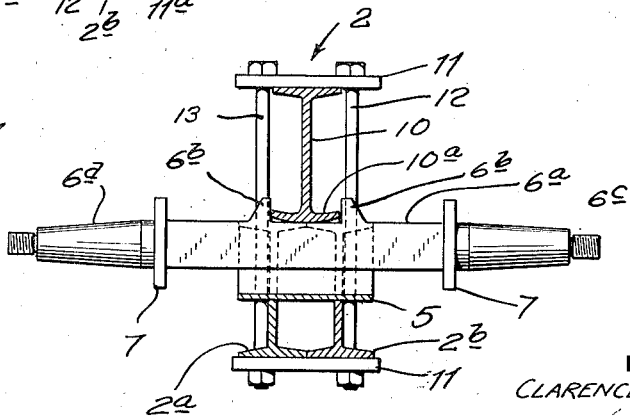
Fig. 3 is a section taken along the line 3—3 of Fig. 2.

The axle is retained in the slot in the beam by a load transmitting member 10 shown as an I beam. The I beam 10 is mounted on the top of the beam 2, centrally thereof, and extends longitudinally of the beam 2. The beam 10 thus traverses the slot formed in the beam 2 and in which the axle is mounted. As shown in Fig. 3, somewhat exaggerated, the lower flange 10a of the beam 10 is made transversely arcuate so as to permit a rocking movement of the axle 6. The beam 10 is secured in place on the beam 2 by three pair of plates 11 and bolts extending between the plates. These three pair of plates, and the bolts extending therebetween, are identical and but one pair will therefore be described. A pair of plates consists of a plate 11a that extends under and transversely of the beam 2, and a plate 11b that extends transversely of the beam 10. The plates 11a and 11b are of such length that they extend to the edge of the beam 2. On one side of the beam 2, and extending between the plate 11a and the plate 11b, there is a bolt 12. The bolt 12 extends through aligned openings provided therefor in the plates 11a and 11b and the flanges of the beam 2. On the other side of the beam 2, a similar bolt 13 extends between the plates and through aligned openings in the plates and the flanges of the beam 2. These bolts when drawn up secure the beam 10 to the beam 2 in the position shown clearly in Fig. 2. The load on the platform 1 of the trailer is in this construction transmitted to the beam 2, through the plates 11 and the bolts 12 and 13 to the plates 11b on the beam 10. The load is transmitted from the beam 10 to the axle 6 upon which the beam 10 rests.

In the assembled condition, the beam 10, due to the load transmitted from the beam 2, rests upon the axle 6 as shown in Fig. 3. The keepers 6a and 6b extending upwardly from the axle embrace the flange 10a of the beam 10. These keepers prevent movement of the axle axially thereof. The axle is however free to rock about the arcuate flange 10a of the beam 10. By virtue of this freedom to rock, the wheels mounted on the axle 6 may accommodate themselves to variations in the road surface. It will thus be seen that by this construction there is provided a trailer construction which does not require the use of springs or trunnions but in which the load is directly transmitted to the axles upon which the wheels are mounted and the axle is free to rock so that the wheels may accommodate themselves to variations in the road surface.

The word "trailer" as used herein is intended to comprehend any type of vehicle to which the invention is adaptable whether or not it be capable of self propulsion.

It will be obvious that various changes may be made by those skilled in the art in the details of the embodiment illustrated in the drawing and described above within the principle and scope of the invention as expressed in the appended claims.

I claim:

1. In a heavy duty trailer construction, a frame including a side beam extending longitudinally of the trailer, the beam having a transverse slot of rectangular shape in cross-section cut therein adjacent one end thereof, an axle within the slot and extending transversely of the beam, the section of the axle within the slot being substantially square in cross-section, a load-transmitting member for transmitting the load from the beam to the axle, said load-transmitting member being secured to the beam and having a transversely arcuate section traversing the axle-receiving slot in the beam, and integral keepers on the axle positioned to engage the opposite edges of said load-transmitting member.

2. In a heavy duty vehicle of the character described, the combination comprising an axle of polygonal configuration in cross-section, a load transmitting beam resting directly upon the axle and forming a fulcrum about which the axle may oscillate, and means for restraining axial movement of the axle with respect to the beam.

3. In a heavy duty vehicle of the character described, the combination comprising an axle of polygonal configuration in cross-section, a load transmitting beam having a transversely curved under surface resting upon the axle and forming a fulcrum about which the axle may oscillate, and integral keepers on the axle positioned to engage opposite edges of the beam.

4. In a heavy duty vehicle of the character described, the combination comprising an axle of polygonal configuration in cross-section, a load transmitting beam bearing upon the axle and forming a fulcrum about which the axle may oscillate, one of the contacting surfaces being curved transversely of the load transmitting beam, and keepers for the axle positioned to engage opposite edges of the beam.

5. In a heavy duty vehicle of the character described, the combination comprising an axle of polygonal configuration in cross-section, a rigid load transmitting beam traversing and bearing directly upon the axle and forming a fulcrum about which the axle may oscillate and means for restraining longitudinal movement of the axle with respect to the beam.

CLARENCE F. JONES.